(12) United States Patent
Takane

(10) Patent No.: US 8,488,033 B2
(45) Date of Patent: Jul. 16, 2013

(54) PHOTOGRAPHING APPARATUS AND PHOTOGRAPHING METHOD

(75) Inventor: Yasuo Takane, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 12/976,626

(22) Filed: Dec. 22, 2010

(65) Prior Publication Data

US 2011/0149131 A1    Jun. 23, 2011

(30) Foreign Application Priority Data

Dec. 22, 2009  (JP) ................................. 2009-290774
Dec. 13, 2010  (KR) ....................... 10-2010-0127098

(51) Int. Cl.
*H04N 5/335*  (2006.01)
*G03B 15/03*  (2006.01)

(52) U.S. Cl.
USPC ........................................ 348/296; 396/194

(58) Field of Classification Search
USPC ................................................ 348/362–369
See application file for complete search history.

(56) References Cited

U.S. PATENT DOCUMENTS

| | | | | |
|---|---|---|---|---|
| 6,542,194 | B1* | 4/2003 | Juen | 348/367 |
| 7,630,009 | B2* | 12/2009 | Arishima et al. | 348/296 |
| 7,653,293 | B2* | 1/2010 | Masuda | 396/55 |
| 7,724,301 | B2* | 5/2010 | Alakarhu | 348/362 |
| 7,725,013 | B2* | 5/2010 | Sugimoto et al. | 396/17 |
| 7,907,206 | B2* | 3/2011 | Toyoda | 348/367 |
| 8,159,578 | B2* | 4/2012 | Arishima et al. | 348/296 |
| 2005/0128324 | A1* | 6/2005 | Kishi et al. | 348/294 |
| 2005/0225664 | A1* | 10/2005 | Matsumoto | 348/362 |
| 2006/0098115 | A1* | 5/2006 | Toyoda | 348/362 |
| 2008/0151087 | A1* | 6/2008 | Matsumoto | 348/296 |
| 2008/0291317 | A1* | 11/2008 | Endo et al. | 348/340 |
| 2008/0298791 | A1* | 12/2008 | Noda | 396/55 |
| 2009/0015704 | A1* | 1/2009 | Namai et al. | 348/340 |
| 2009/0040346 | A1* | 2/2009 | Masuyama et al. | 348/294 |
| 2009/0174784 | A1* | 7/2009 | Karlsson et al. | 348/222.1 |
| 2009/0231450 | A1* | 9/2009 | Tanaka et al. | 348/208.7 |
| 2009/0268083 | A1* | 10/2009 | Arishima et al. | 348/362 |

FOREIGN PATENT DOCUMENTS

| | | |
|---|---|---|
| JP | 11-41523 A | 2/1999 |
| JP | 2007-53742 A | 3/2007 |
| JP | 2007-159061 A | 6/2007 |

* cited by examiner

*Primary Examiner* — Sinh Tran
*Assistant Examiner* — Selam Gebriel
(74) *Attorney, Agent, or Firm* — Drinker Biddle & Reath LLP

(57) ABSTRACT

Photographing having a wide dynamic range is performed by adjusting a discharging time for discharging charges accumulated in an image pickup device. A photographing apparatus comprises an image pickup device having a plurality of pixels arranged in a matrix form and photographs a subject by exposing the image pickup device to light, and also includes: a detector that detects a photographing state of the subject; an operation controller that controls an operation of a curtain body traveling to block light to the image pickup device; and a scan controller that controls an exposure start scanning of the image pickup device by discharging charges accumulated in the image pickup device before the traveling of the curtain body, wherein the scan controller adjusts a discharging time for discharging the charges accumulated in the image pickup device according to the photographing state of the subject.

13 Claims, 10 Drawing Sheets

FIG. 9
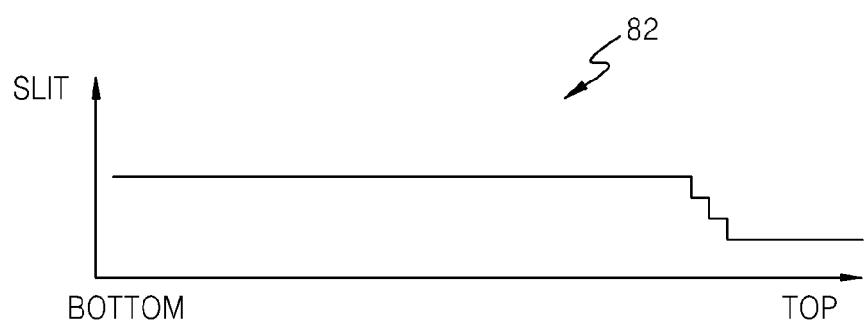
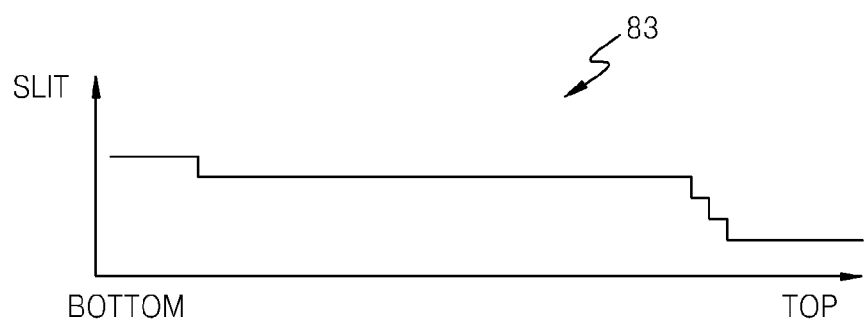

PHOTOGRAPHING APPARATUS AND PHOTOGRAPHING METHOD

CROSS-REFERENCE TO RELATED PATENT APPLICATION

This application claims the priority benefit of Japanese Patent Application No. 2009-290774, filed on Dec. 22, 2009, in the Japan Patent Office, and Korean Patent Application No. 10-2010-0127098, filed on Dec. 13, 2010, in the Korean Intellectual Property Office, the disclosures of which are incorporated herein in their entirety by reference.

BACKGROUND

1. Field of the Invention

Embodiments relate to a photographing apparatus and a photographing method, and more particularly, to a photographing apparatus including an image pickup device having a plurality of pixels arranged in a matrix form, and a photographing method thereof.

2. Description of the Related Art

Japanese Patent Laid-Open Gazette No. H11-41523 (hereinafter, referred to as Cited Reference 1) discloses a photographing apparatus equipped with a complementary metal-oxide semiconductor (CMOS) type image pickup device, wherein a front curtain of a shutter operation is performed by using an electronic shutter and a rear curtain of the shutter operation is performed by using a mechanical shutter. Also, Japanese Patent Laid-Open Gazette No. 2007-159061 and Japanese Patent Laid-Open Gazette No. 2007-53742 (hereinafter, respectively referred to as Cited References 2 and 3) disclose a technology for preventing an exposure spot occurring from a difference between lens types, iris values, or shutter speeds, by changing a timing of starting charge accumulation in every area or line in a method of mixing an electronic shutter and a mechanical shutter.

Cited References 2 and 3 aim to compensate for an imagery defect generated by replacing a conventional mechanical front curtain with an electronic reset function. Thus, an operation timing of an electronic shutter constituting a front curtain is set to have almost the same characteristics as an operation timing of a mechanical shutter constituting a rear curtain. In addition, an operation timing is set considering compensation parameters with respect to causes that change shutter characteristics, such as a lens type and an iris value.

However, a dynamic range of a conventional image pickup device is still narrow, and thus it is difficult to reproduce a dark place and a bright place in an image. For example, when a person is to be photographed with a bright blue sky as a background, the sky is saturated and is not reproduced due to over-exposure if exposure is focused on the person. Alternatively, if the exposure is focused on the sky, the person may be photographed in black due to underexposure.

The electronic shutter operates as a front curtain of a shutter that starts exposure of an image pickup device by discharging charges accumulated in the image pickup device. Here, if a time taken to discharge the charges is not sufficient, an afterimage is generated due to remaining charges. Generally, a sufficient discharging time is set to completely discharge the charges so that the afterimage is not generated. However, since the remaining charges may be deliberately generated so as to obtain a long exposure effect, obtaining a good image having a wide dynamic range may be required by adjusting a time taken to discharge the charged for every area or line.

SUMMARY

Embodiments include a new and modified photographing apparatus and photographing method, wherein photographing in a wide dynamic range is possible by adjusting a time taken to discharge charges accumulated in an image pickup device in a configuration of using both an electronic shutter and a mechanical shutter.

According to an embodiment, a photographing apparatus includes an image pickup device having a plurality of pixels arranged in a matrix form and that photographs a subject by being exposed to light; a detector that detects a photographing state of the subject; an operation controller that controls an operation of a curtain body traveling to block light to the image pickup device; and a scan controller that controls an exposure start scanning of the image pickup device by discharging charges accumulated in the image pickup device before the traveling of the curtain body, wherein the scan controller adjusts a discharging time for discharging the charges accumulated in the image pickup device according to the photographing state of the subject.

Here, the photographing state of the subject is detected, the charges accumulated in the image pickup device are discharged by adjusting the discharging time for discharging the charges according to the photographing state, and the curtain body travels to block light to the image pickup device after the image pickup device is exposed to light. Accordingly, photographing having a wide dynamic range may be performed by adjusting an exposure time of the image pickup device according to the photographing state.

The scan controller facilitates the exposure start scanning of the image pickup device to operate as a front curtain (hereinafter, also referred to as an electronic front curtain shutter) of a shutter for starting the exposure of the image pickup device by assigning a reset signal to each pixel based on a scan pattern, and the operation controller facilitates the curtain body to block light to the image pickup device to operate as a rear curtain (hereinafter, also referred to as a mechanical rear curtain shutter) of the shutter. Accordingly, an electronic shutter constituting the front curtain and a mechanical shutter constituting the rear curtain are used together, and the exposure time may be adjusted by controlling a timing of the electronic shutter.

The detector may detect whether the photographing state of the subject is within a suitable dynamic range when an image is reproduced, and the scan controller may adjust the discharging time for discharging the charges accumulated in the image pickup device if the detector detects that the photographing state of the subject is outside the suitable dynamic range. Accordingly, the exposure time may be adjusted if an image is not reproduced since the photographing state is outside the dynamic range, i.e., due to white blurring or black transition.

The scan controller may generate a discharging pulse for discharging the charges accumulated in the image pickup device to correspond to a traveling curve of the curtain body and adjust a pulse width of the discharging pulse according to the photographing state of the subject. Accordingly, the exposure time of the image pickup device may be adjusted by controlling a scan start speed of the front curtain by corresponding the discharging pulse to the traveling curve of the curtain body while varying the pulse width of the discharging pulse according to the photographing state.

The scan controller may adjust the pulse width of the discharging pulse according to lines of the image pickup device. The scan controller may adjust the pulse width of the discharging pulse according to areas of the image pickup device. Accordingly, the exposure time of the image pickup device may be adjusted according to lines or areas.

The scan controller may adjust the discharging time according to brightness information of the subject. The scan controller may set the discharging time to be shorter than a predetermined discharging time if brightness of the subject is lower than a predetermined reference value. The scan controller may set the discharging time to decrease stepwise according to the brightness of the subject, if the brightness of the subject is lower than the predetermined reference value. Accordingly, the exposure time of the image pickup device may be adjusted according to the brightness information of the subject.

The scan controller may control read scanning of each pixel of the image pickup device, and the photographing apparatus may further include a gain adjuster for adjusting a gain according to predetermined areas by synchronizing with reading of pixels in a horizontal direction of the image pickup device by the scan controller. Accordingly, a gain in a horizontal direction may be adjusted According to another embodiment, a photographing method of photographing a subject by exposing an image pickup device having a plurality of pixels arranged in a matrix form to light, includes: detecting a photographing state of the subject; starting exposure of the image pickup device by adjusting a discharging time for discharging charges accumulated in the image pickup device according to the photographing state of the subject; and operating a curtain body traveling to block light to the image pickup device after starting the exposure of the image pickup device.

BRIEF DESCRIPTION OF THE DRAWINGS

The above and other features and advantages will become more apparent by describing in detail exemplary embodiments with reference to the attached drawings in which:

FIG. 9 illustrates graphs for describing adjustment of a gain and a shutter, according to an embodiment.

DETAILED DESCRIPTION

Figure 1:
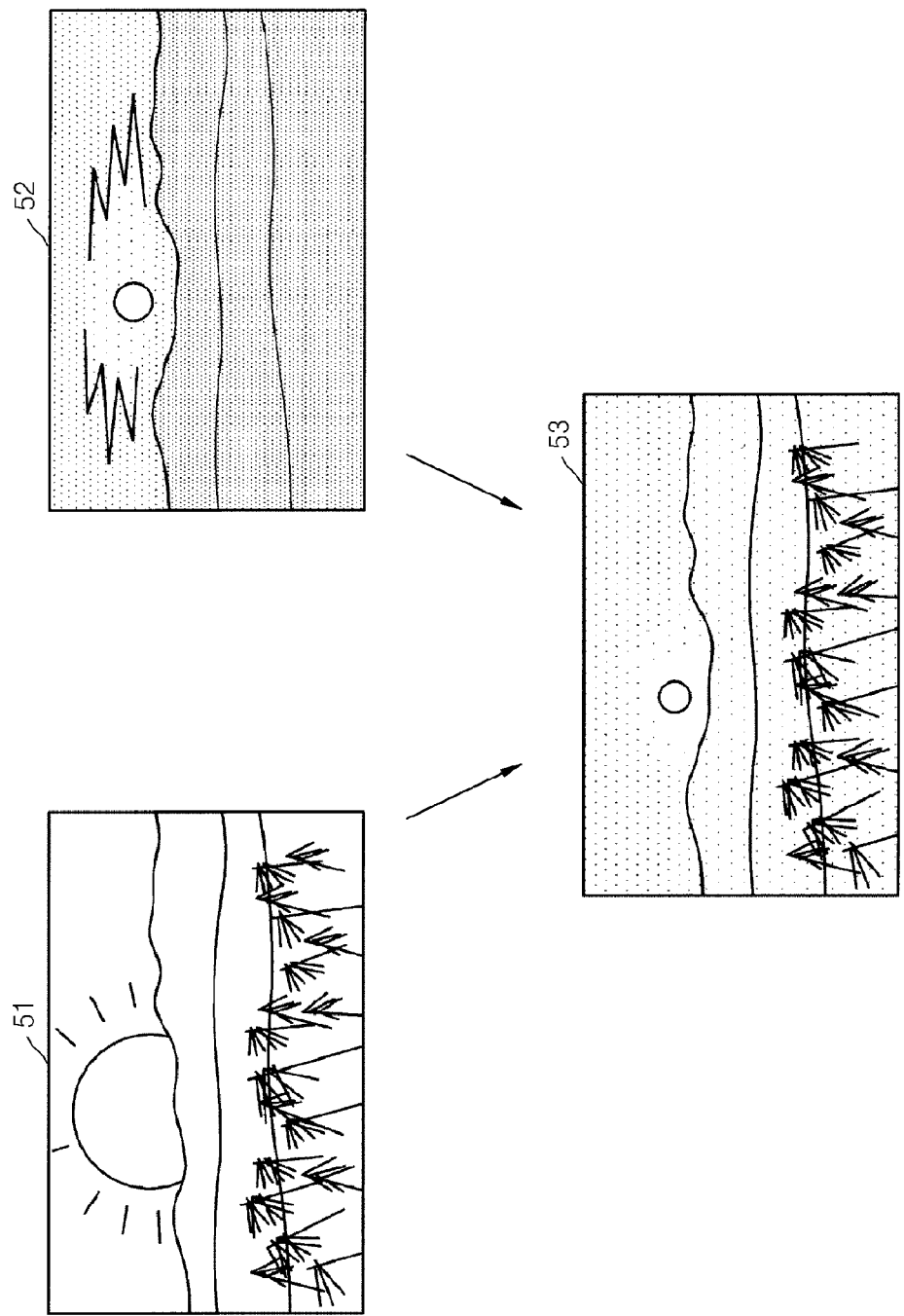
FIG. 1 is a diagram for describing quality improvement by a photographing apparatus, according to an embodiment.

Hereinafter, exemplary embodiments will be described more fully with reference to the accompanying drawings. In the drawings, like reference numerals denote like elements.

Corresponding embodiments will be described according to the following order.

[1] Objectives of embodiments
[2] Outline of photographing apparatus
[3] Functional configuration of photographing apparatus
[4] Details of operations of photographing apparatus

[1] Objectives of Embodiments

First, objectives of embodiments will be described. A photographing apparatus equipped with a complementary metal-oxide semiconductor (CMOS) type image pickup device, wherein a front curtain of a shutter operation is performed by using an electronic shutter and a rear curtain of the shutter operation is performed by using a mechanical shutter is disclosed. Also, a technology for preventing an exposure spot occurring from a difference between lens types, iris values, or shutter speeds, by changing a timing of starting charge accumulation in every area or line in a method of mixing an electronic shutter and a mechanical shutter is disclosed.

The above technology aims to compensate for an imagery defect generated by replacing a conventional mechanical front curtain with an electronic reset function. Thus, an operation timing of an electronic shutter constituting a front curtain is set to have almost the same characteristics as an operation timing of a mechanical shutter constituting a rear curtain. In addition, an operation timing is set considering compensation parameters with respect to causes that change shutter characteristics, such as a lens type and an iris value.

However, a dynamic range of a conventional image pickup device is still narrow, and thus it is difficult to reproduce a dark place and a bright place in an image. For example, when a person is to be photographed with a bright blue sky as a background, the sky is saturated and is not reproduced due to over-exposure if exposure is focused on the person. Alternatively, if the exposure is focused on the sky, the person may be photographed in black due to lack of exposure.

The electronic shutter operates as a front curtain of a shutter that starts exposure of an image pickup device by discharging charges accumulated in the image pickup device. Here, if a time taken to discharge the charges is not sufficient, an afterimage is generated due to remaining charges. Generally, a sufficient discharging time is set to completely discharge the charges so that the afterimage is not generated. However, since the remaining charges may be deliberately generated so as to obtain a long time exposure effect, a good image having a wide dynamic range may be obtained by adjusting a time taken to discharge the charged for every area or line.

According to an embodiment of the photographing apparatus, photographing in a wide dynamic range is facilitated by adjusting a time taken to discharge charges accumulated in an image pickup device in a configuration of using both an electronic shutter and a mechanical shutter.

[2] Outline of Photographing Apparatus

An outline of a photographing apparatus according to an embodiment will now be described. First, quality improvement by the photographing apparatus will be described with reference to FIG. 1. FIG. 1 is a diagram for describing the quality improvement by the photographing apparatus, according to an embodiment. Images 51, 52, and 53 are photographs of a scenery including the sun, a mountain, miscanthus, etc. The image 51 is taken by adjusting exposure to the lower part of image 51. In the image 51, the miscanthus etc. at the lower part of image 51 is photographed well, but the vicinity of the sun at the upper part of image 51 is blurred white. The image 52 is taken by adjusting exposure to the sun on the top. In the image 52, the sun is photographed well, but the miscanthus etc. at the bottom is black due to underexposure.

In the image 53, exposure is adjusted by the photographing apparatus of the current embodiment. The vicinity of the sun in the image 53 is not as white as that in the image 51, the bottom of the image 53 is not as black as that of the image 52, and the sun, the mountain, and the miscanthus are photographed well. As described above, the photographing apparatus uses an electronic shutter and a mechanical shutter together. When exposure is started by the electronic shutter (electronic front curtain shutter) constituting a front curtain, the photographing apparatus may adjust an exposure time according to areas or lines by adjusting a discharging time for discharging charges accumulated in an image pickup device.

As described above, charges remain if the discharging time is not sufficient to completely discharge the charges accumulated in the image pickup device, and as a result, an afterimage is formed. For example, by setting the discharging time in such a way that the remaining charges intentionally remain in a dark portion of an image, the dark portion may have an effect as if the dark portion was exposed to light for a long time. In detail, the photographing apparatus divides a photographing screen according to areas, and analyzes a photographing scene by detecting the distribution of brightness in each area. Then, the photographing apparatus changes the discharging time of the electronic front curtain shutter based on a value of the brightness of each area, thereby adjusting the exposure time according to the photographing scene.

For example, in the image 53, the brightness at the top and the brightness at the bottom are different. In other words, the top is bright and the bottom is dark. Thus, the photographing apparatus sets a discharging time in such a way that the accumulated charges are completely discharged at the top and remaining charges remain at the bottom so that an exposure time at the bottom is long.

For example, when brightness (luminance) in an image is higher than 128, a discharging time is set in such a way that charges are completely discharged, and when luminance is equal to or lower than 128, the discharging time may be adjusted according to a value of the luminance. In other words, more remaining charges remain by reducing the discharging time as the image darkens and the value of the luminance decreases, so that a dark portion of the image has an effect as if the dark portion was exposed to light for a long time.

Figure 2:
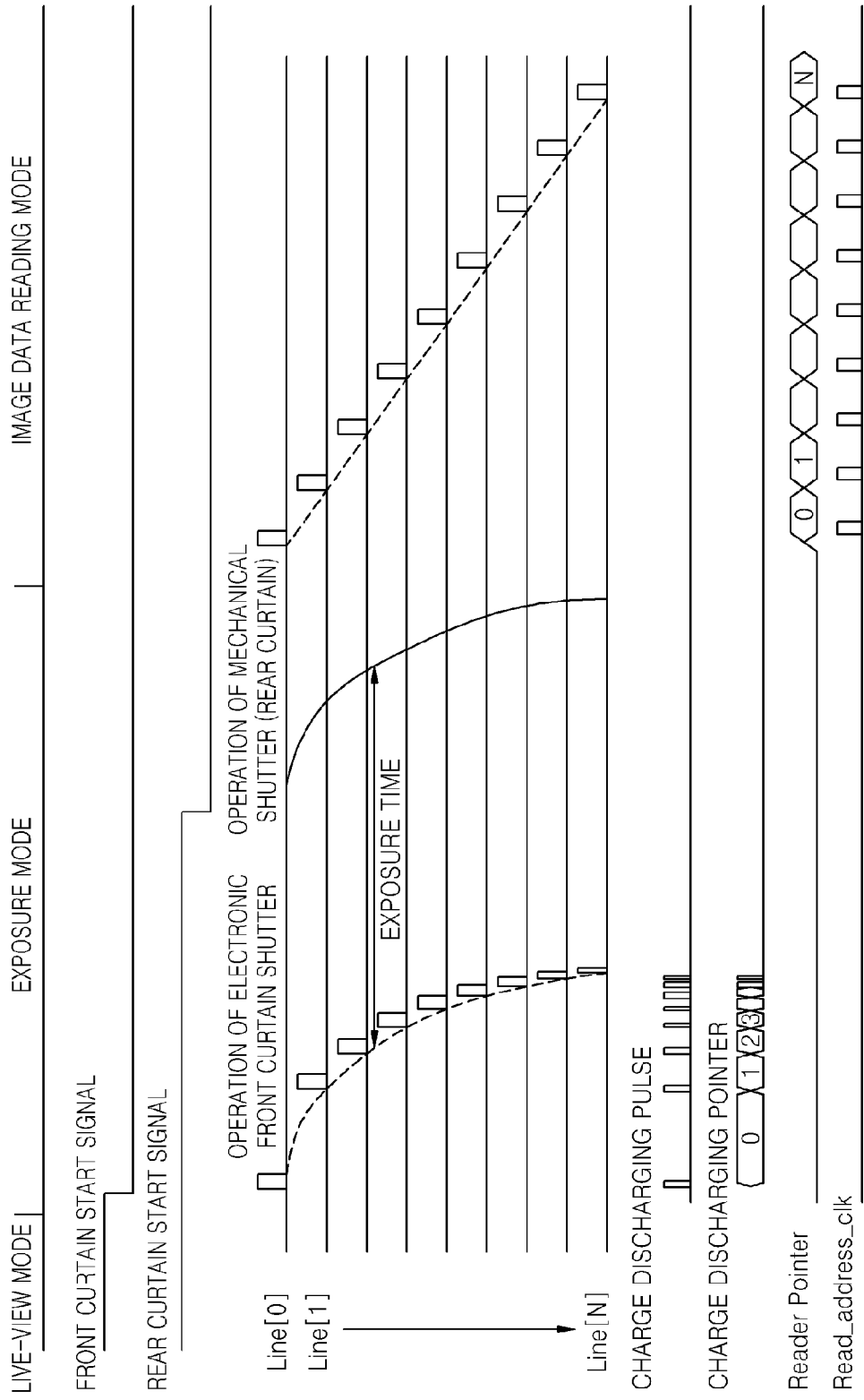
FIG. 2 is a timing diagram for describing operations of the front curtain constituting an electronic shutter and the rear curtain constituting a mechanical shutter, according to an embodiment.

A front curtain and a rear curtain of a shutter will now be described with reference to FIG. 2. FIG. 2 is a timing diagram for describing operations of the front curtain constituting an electronic shutter and the rear curtain constituting a mechanical shutter, according to an embodiment. In FIG. 2, a horizontal axis denotes time and a vertical axis denotes a line number in an image pickup device. Here, N in Line[N] corresponds to an effective line number in a vertical direction of the image pickup device. Also, the photographing apparatus is used to capture a still image in a live-view mode.

When the electronic shutter is used as the front curtain, the image pickup device starts to perform an exposure operation by sequentially assigning a reset signal that enables a reset operation to pixels of the image pickup device in a pixel line unit. Then, after a set exposure time, the exposure operation of the image pickup device is ended by mechanically blocking light by moving a curtain body. When the exposure operation of the image pickup device is ended, image data is read from the image pickup device.

As shown in FIG. 2, in the mechanical shutter, a moving speed of the curtain body is not uniform, a curtain speed is relatively slow at a moving start and relatively fast at a moving end due to acceleration. Also, the curtain speed may change according to temperature, humidity, or position. Accordingly, the photographing apparatus adjusts a curtain speed of the electronic shutter used as the front curtain to a curtain speed of the mechanical shutter. The meaning of the curtain speed of the electronic shutter being adjusted to the curtain speed of the mechanical shutter is that a scan curve of reset scanning (exposure start scanning) of the electronic shutter has almost the same form as a traveling curve of the mechanical shutter.

As shown in FIG. 2, the exposure start scanning of the electronic shutter is started according to generation of a charge discharging pulse. In detail, a line address which discharging charges is designated by a charge discharging pointer. When the charge discharging pulse goes 'H' (high), an image pickup device of a line designated by the charge discharging pointer is connected to the ground GND, thereby discharging charges accumulated in corresponding pixels. Hereinafter, the discharging of charges accumulated in an image pickup device may also be stated that charges are reset.

As described above, the photographing apparatus is used to capture a still image in a live-view mode. Thus, charges accumulated in the live-view mode are discharged while the charge discharging pulse is 'H'. Generally, a pulse width sufficient to completely discharge charges is set. However, if the charge discharging pulse is 'H' for a short period of time, an afterimage is formed due to remaining charges since a time taken to discharge all the accumulated charges is not sufficient. Here, the remaining charges intentionally remain in a dark portion of an image so that the dark portion may have an effect as if the dark portion was exposed to light for a long time. As shown in FIG. 2, the photographing apparatus adjusts an exposure time by changing a discharging time, i.e., a period of time that the charge discharging pulse is 'H' so as to completely discharge the accumulated charges or intentionally generate the remaining charges.

In FIG. 2, a pulse width near Line[N] of the image pickup device is narrower than a pulse width of Line[0]. A pulse width required to completely discharge charges in Line[0] is set, and the pulse width near Line[N] is narrowed so as to shorten a discharging time, thereby generating remaining charges. Accordingly, an exposure time near Line[N] is increased, and thus it is possible to brighten the dark portion.

The photographing apparatus detects a photographing scene (photographing state) of a subject, such as a white blurring area or a black transition area, based on a value of brightness according to areas or lines of an image. Also, the photographing apparatus adjusts a discharging time according to the detected photographing scene. For example, when the top of the photographing scene is bright and the bottom of the photographing scene is dark, a pulse width sufficient to discharge all charges is set in a moving start (near Line[0]) of the front curtain. Also, a pulse width narrower than the pulse width near Line[0] is set in a moving end (near Line[N]) of the front curtain so that remaining charges remain. As such, photographing may be performed in a wide dynamic range by the photographing apparatus, by adjusting the discharging time according to the photographing scene.

Alternatively, sensitivity (gain) may be partially changed based on the value of brightness in each area. For example, at least one of the exposure time by the electronic shutter according to areas of one screen, and the sensitivity (gain) may be adjusted based on a contrast, locations, or ratio of the white blurring area and the blacked area. Thus, it is possible to obtain an image having a wide dynamic range.

[3] Functional Configuration of Photographing Apparatus

Figure 3:
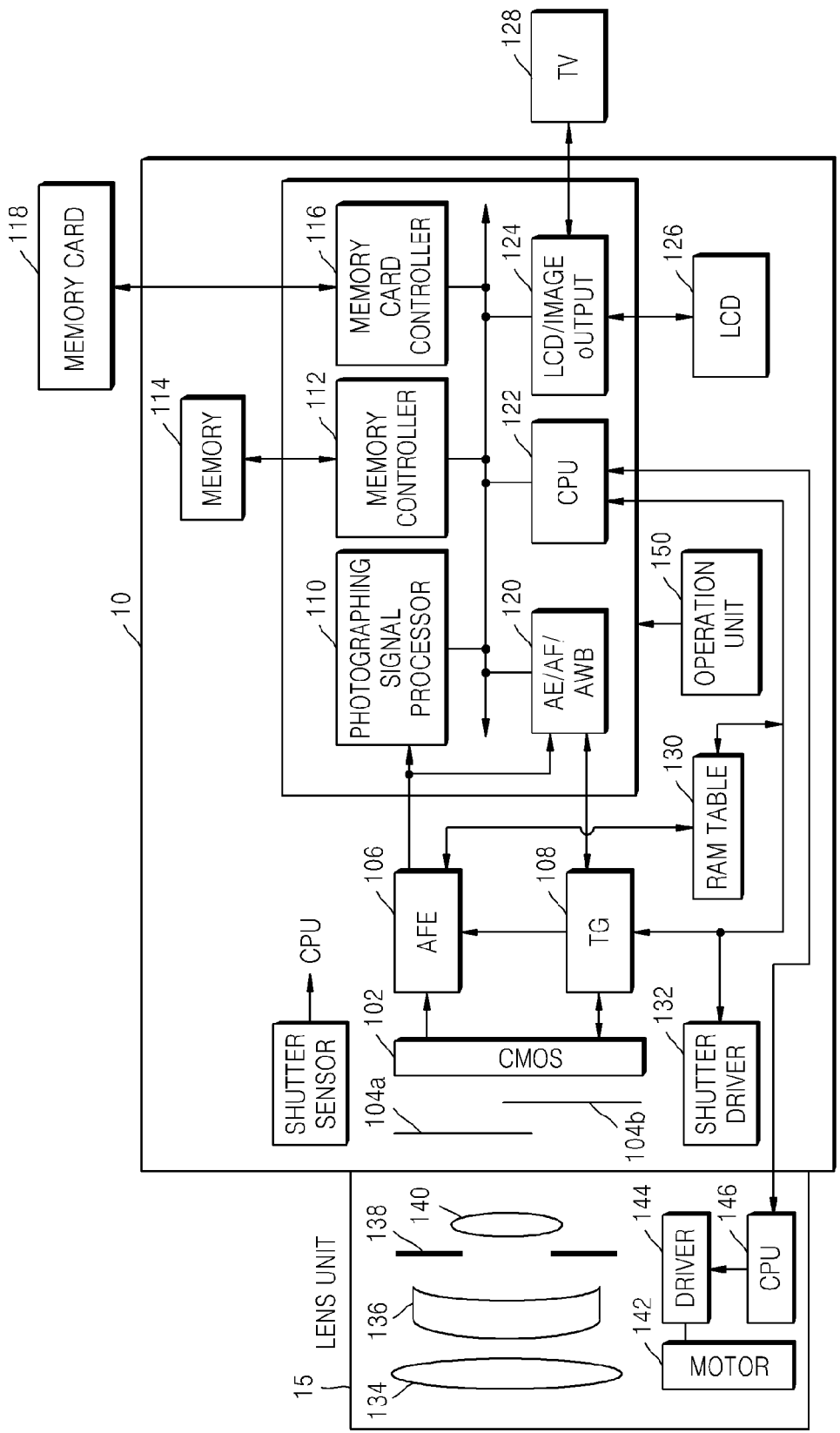
FIG. 3 is a block diagram of a photographing apparatus, according to an embodiment.

The outline of the photographing apparatus has been described. A functional configuration of a photographing apparatus 10 will now be described with reference to FIG. 3. FIG. 3 is a block diagram of the photographing apparatus 10, according to an embodiment.

As shown in FIG. 3, the photographing apparatus 10 includes a CMOS 102, shutters 104a and 104b (hereinafter, also referred to as a shutter unit 104 together), an analog front end (AFE) 106, a timing generator (TG) 108, a photographing signal processor 110, a memory controller 112, a memory 114, a memory card controller 116, an auto exposure/auto focus/auto white balance (AE/AF/AWB) 120, a central processor unit (CPU) 122, a liquid crystal display/image output (LCD/IO) 124, an LCD 126, a random access memory (RAM) table 130, a shutter driver 132, a lens unit 15, and so forth.

The CMOS 102 is an example of an image pickup device having a plurality of pixels arranged in a matrix form, according to an exemplary embodiment, and converts light incident from the lens unit 15 to an electrical signal. In detail, the CMOS 102 outputs image signals of red (R), green (G), and blue (B) by converting a light image of a subject, which is image-formed by the lens unit 15, to analog electrical signals (image signals) of color components of R, G, and B. In the current embodiment, a function as an electronic front curtain shutter is performed by starting a light-exposure operation by applying a reset signal to each pixel of the CMOS 102 at a predetermined timing.

The shutter unit 104 includes a curtain body that moves in a vertical direction of a predetermined pixel line and performs a function as a rear curtain that blocks light exposed to the CMOS 102. The operation of the shutter unit 104 is controlled by the shutter driver 132.

The AFE 106 is an analog front-end circuit and provides the analog electrical signal output from the CMOS 102 to the photographing signal processor 110. The TG 108 inputs a timing signal to the CMOS 102 and the AFE 106. A shutter speed is determined by the timing signal output from the TG 108. In other words, driving of the CMOS 102 is controlled by the timing signal output from the TG 108, and an electrical signal, which becomes the basis of image data, is generated by image light that is incident from a subject within a time of driving the CMOS 102.

The photographing signal processor 110 generates raw data of an image by converting the analog electrical signal output from the AFE 106 to a digital signal. The photographing signal processor 110 also compensates for a gain of light intensity or adjusts a white balance of the raw data of the image obtained from the CMOS 102. The memory controller 112 temporarily stores a captured image in the memory 114 or reads an image stored in the memory 114. The memory 114 has a storage capacity capable of storing a plurality of images. An example of the memory 114 includes a synchronous dynamic random access memory (SDRAM).

The memory card controller 116 records a captured image or a composed image in a memory card 118. The memory card 118 is a card type storage device for recording data in a flash memory.

The AE/AF/AWB 120 detects surrounding light intensity (brightness), a focal length, an iris value (focus), and color temperature during photographing, and provides a detection result to the CPU 122. The CPU 122 performs a signal system command for the CMOS 102 or the TG 108 or performs an operation system command for an operation unit 150. In the current embodiment, the signal system command and the operation system command are performed by one CPU 122, but alternatively, the signal system command and the operation system command may be performed by two CPUs, respectively. Controlling of a front curtain constituting an electronic shutter and a rear curtain constituting a mechanical shutter by the CPU 122 will be described in detail later.

The LCD 126 displays a live-view before photographing, various setup screens of the photographing apparatus 10, or a captured image. Also, a television (TV) 128 displays a captured image on a screen thereof. Image data is displayed on the LCD 126 or the TV 128 by using the LCD/IO 124.

The RAM table 130 stores a scan table according to an embodiment. The RAM table 130 may pre-store a plurality of scan patterns to select a scan pattern according to a photographing scene. Alternatively, the RAM table 130 may store a reference scan pattern to change the reference scan pattern according to a difference between a value of surrounding light intensity or the like of a photographing scene and a reference value. A scan pattern is a timing of outputting a reset timing (exposure start timing) by an electronic front curtain shutter. In the current embodiment, a scan curve of reset scanning of an electronic front curtain shutter has almost the same form as a traveling curve of a mechanical rear curtain shutter.

Also, the RAM table 130 stores an amount of charges accumulated in the image pickup device and a time required to discharge the accumulated charges. Also, the RAM table 130 may store a ratio of a discharging time according to a photographing scene, for example, according to luminance of a captured image. For example, the RAM table 130 may store a table showing a reduction rate between a luminance value and a reference time constituting a time required to discharge all the charges accumulated in the image pickup device. Accordingly, the discharging time according to a photographing scene may be adjusted by using the reference time and the reduction rate.

A function generation circuit (not shown) instead of the RAM table 130 for storing a scan pattern may be equipped in the photographing apparatus 10. In this case, a method of simply representing with a quadratic function or a method of interpolating with a linear function may be used. A size of a circuit equipped in the photographing apparatus 10 may be decreased by outputting a scan timing by the function generation circuit.

The operation unit 150 includes members for operating the photographing apparatus 10 or performing various settings during photographing. The members of the operation unit 150 may include a power button, a cross key and a selection button for selecting a photographing mode or a photographing drive mode and setting effect parameters, and a shutter button for starting an operation of photographing a subject.

Figure 4:
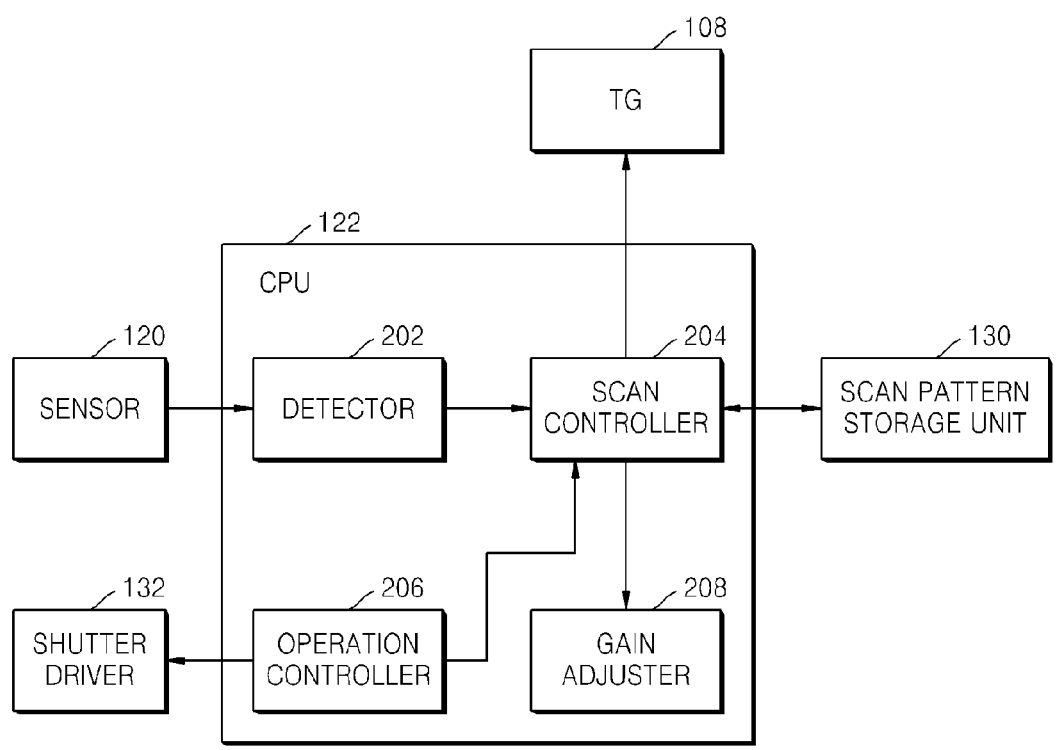
FIG. 4 is a block diagram of a central processing unit (CPU), according to an embodiment.

The controlling of the front curtain and the rear curtain by the CPU 122 will now be described with reference to FIG. 4. FIG. 4 is a block diagram of the CPU 122, according to an embodiment. As shown in FIG. 4, the CPU 122 includes a detector 202, a scan controller 204, an operation controller 206, and a gain adjuster 208.

The detector 202 detects a photographing state of a subject. In detail, the detector 202 detects the photographing state (photographing scene) from surrounding light intensity (brightness), a focal length, an iris value, and a color temperature detected by various sensors 120, such as the AE/AF/AWB, and detects whether the photographing scene is within a suitable dynamic range when the photographing scene is reproduced as an image. For example, the detector 202 detects whether an image, which cannot be reproduced because of white blurring due to overexposure or black transition due to underexposure, exists.

Figure 5:
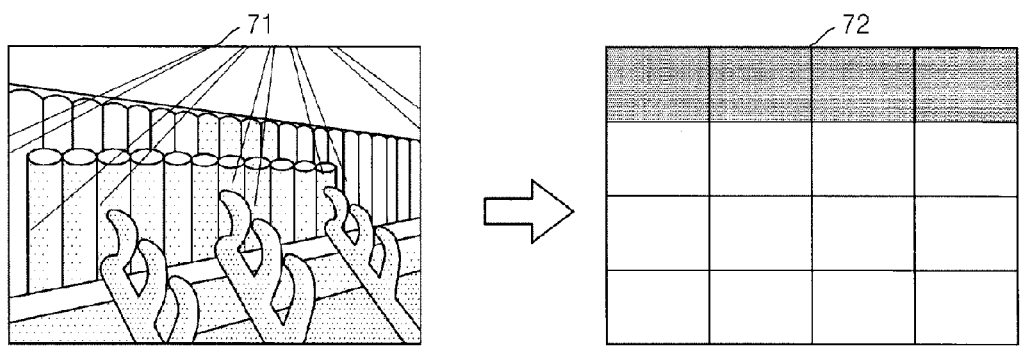
FIG. 5 is a diagram for describing detection of a photographing scene, according to an embodiment.
Figure 6:
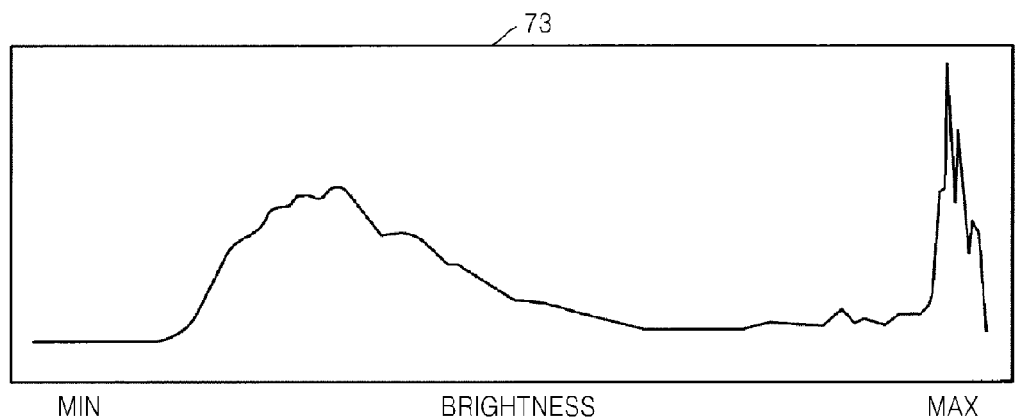
FIG. 6 is a diagram for describing detection of a photographing scene, according to another embodiment.

Detection of a photographing scene by the detector 202 will now be described with reference to FIGS. 5 and 6. FIGS. 5 and 6 are diagrams for describing the detection of the photographing scene by the detector 202, according to an embodiment. FIG. 5 illustrates an image in which a blue sky cannot be reproduced since an upper part of the image is blurred due to white blurring. The detector 202 detects an area in which white blurring occurs in a screen 71. For example, a white blurring area may be detected by dividing the screen 71 into predetermined regions as shown in a description drawing 72. In this case, 4 upper regions of the screen 71 are detected as a white blurring area, i.e., an area exceeding the upper limit of the dynamic range.

A white blurring area in a screen may be detected by a histogram 73 shown in FIG. 6. The histogram 73 shows high peaks on the right, which shows that there is an area in which white blurring particularly occurs in a portion of the screen. The photographing apparatus 10 is capable of suppressing exposure of the white blurring area as the scan controller 204 that will be described later controls exposure intensity of the image pickup device to compensate for an exposure time according to areas or lines of the screen.

The structure of the CPU 122 will be again described referring back to FIG. 4. The scan controller 204 starts to expose the CMOS 102 to light by discharging the charges accumulated in the CMOS 102 before the operation controller 206 that will be described later moves the curtain body. The scan controller 204 adjusts the discharging time for discharging the charges accumulated in the image pickup device, according to the photographing state of the subject detected by the detector 202. The scan controller 204 discharges the charges accumulated in the CMOS 102 based on the scan pattern stored in a scan pattern storage unit (RAM table) 130.

Also, the discharging time for discharging the charges accumulated in the CMOS 102 is adjusted based on the ratio of the discharging time stored in the scan pattern storage unit 130. The discharging time may be changed by adjusting a pulse width of a charge discharging pulse.

Figure 7:
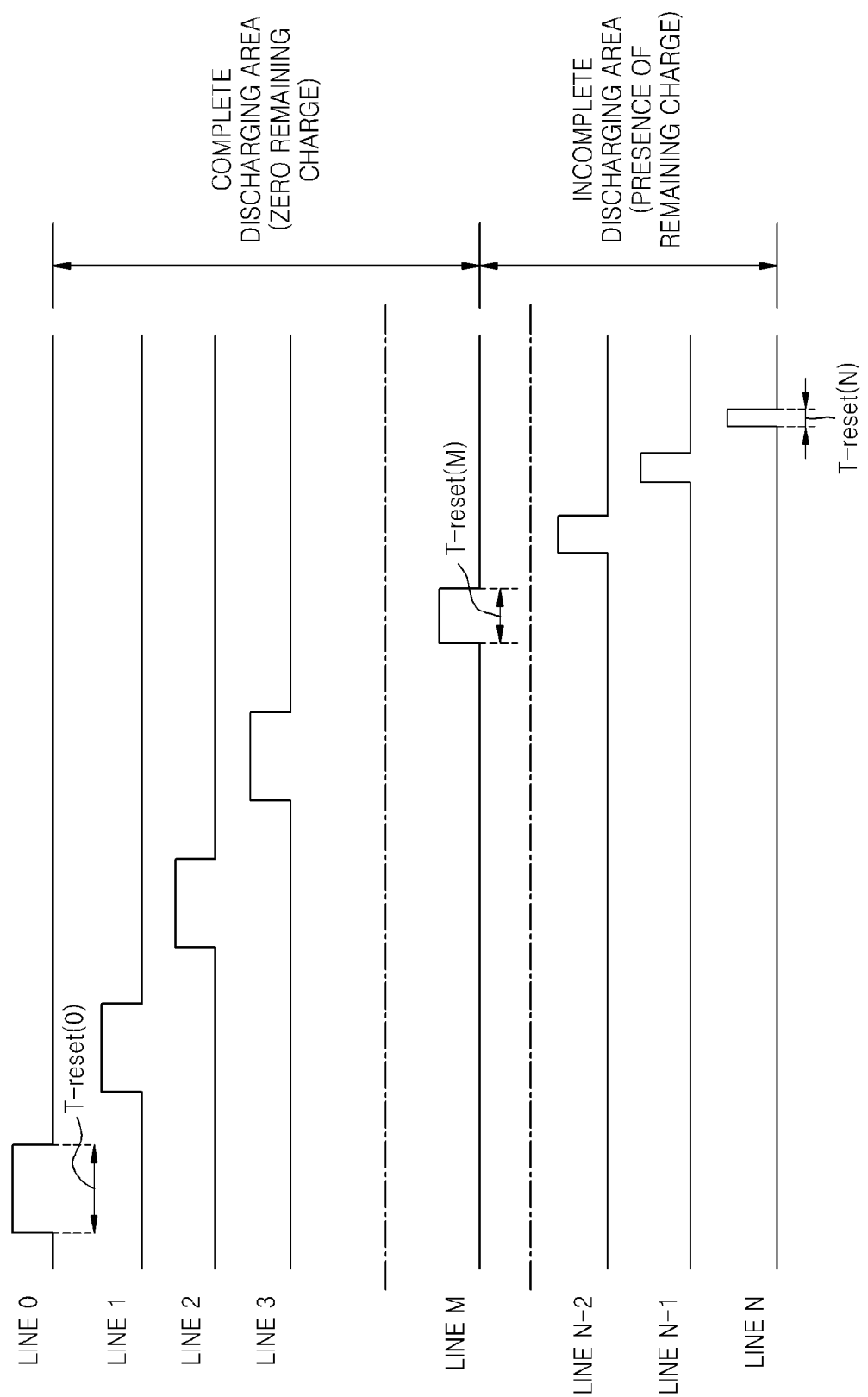
FIG. 7 is a timing diagram for describing a relationship between a photographing scene and a pulse width of a charge discharging pulse, according to an embodiment.
Figure 8:
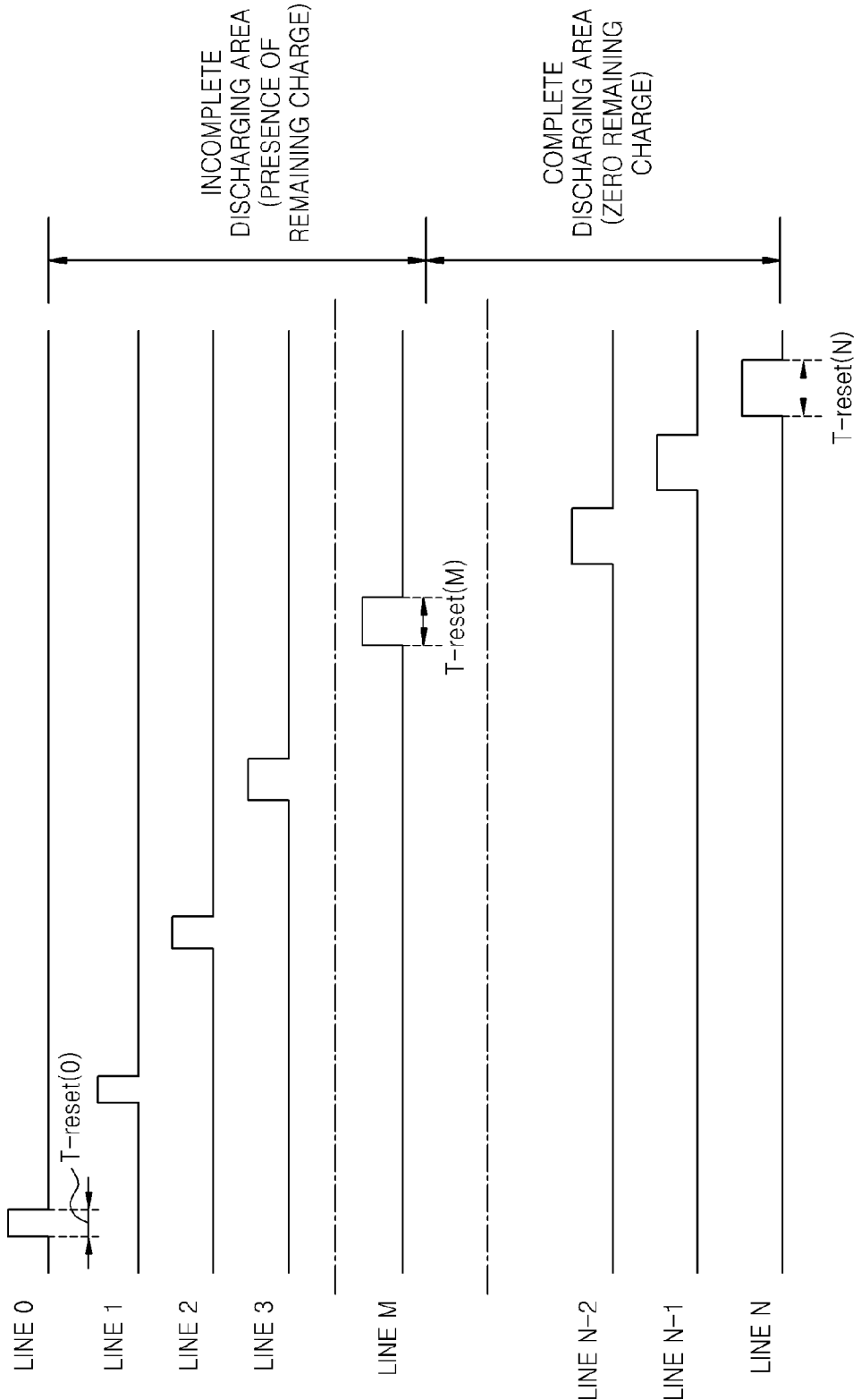
FIG. 8 is a timing diagram for describing a relationship between a photographing scene and a pulse width of a charge discharging pulse, according to another embodiment.

Here, a relationship between the photographing scene and the pulse width of the charge discharging pulse will now be described with reference to FIGS. 7 and 8. FIGS. 7 and 8 are timing diagrams for describing the relationship between the photographing scene and the pulse width of the charge discharging pulse, according to an embodiment. As shown in FIG. 7, an area from Line[0] to Line[M] of the image pickup device is a complete discharging area in which the charges accumulated in the image pickup device are completely discharged (zero remaining charge). Also, an area from Line[M] to Line[N] is an incomplete discharging area in which the charges accumulated in the image pickup device intentionally remain (presence of remaining charge).

The pulse widths of the charge discharging pulses are uniform in the complete discharging area from Line[0] to Line[M], and are sufficient to discharge the charges accumulated in the CMOS 102. Also, the pulse widths of the charge discharging pulses in the incomplete discharging area from Line[M] to Line[N] are narrower than those in the complete discharging area, and thus the charges remain in the incomplete discharging area. Also, the pulse widths decrease from Line[M] to Line[N] as a line number increases. As such, by decreasing the pulse widths, more charges remain in the image pickup device, and thus an effect as if an image was exposed to light for a long time may be obtained.

For example, the photographing apparatus 10 performs the exposure start scanning from the top to the bottom of a captured image. When the bottom of the captured image is dark, i.e., when a luminance value of the bottom of the captured image is low, a pulse width of an lower line of the captured image may be narrower than a pulse width of a upper line of the captured image, as shown in FIG. 7, so that an exposure time on the top of the captured image is longer.

For example, when brightness (luminance) value of an image is shown in 256 levels from 0 to 255, exposure is determined to be suitable when the luminance value is equal to or above 128, and thus a pulse width is adjusted in such a way that remaining charges are zero. Alternatively, when the luminance value is below 128, the image is determined to be dark, and thus a pulse width is adjusted in such a way that the pulse width is narrower than a pulse width of a complete discharging area so that accumulated charges remain. Alternatively, when the luminance value is below 128, a reduction rate of a pulse width with respect to the luminance value is set, and the pulse width decreases as the luminance value decreases. Accordingly, the exposure time is adjusted according to lines, thereby obtaining an image having a wide dynamic range.

When the top of a captured image is dark, i.e., when a luminance value of the top of the captured image is low, a pulse width of an upper line of the captured image may be adjusted to be narrower than that of an lower line, as shown in FIG. 8, so that an exposure time in the top of the captured image is long.

In FIG. 8, an area from Line[0] to Line[M] of the image pickup device is an incomplete discharging area in which the charges accumulated in the image pickup device intentionally remain (presence of remaining charges). Also, an area from Line[M] to Line[N] of the image pickup device is a complete discharging area in which the charges accumulated in the image pickup device are all discharged (zero remaining charge).

Pulse widths set in the incomplete discharging area from Line[0] to Line[M] are narrower than those set in the complete discharging area from Line[M] to Line[N] so that the accumulated charges remain in the incomplete discharging area. Also, the pulse width widens from Line[0] to Line[M] as a line number increases. As described above, by narrowing the pulse width, more charges remain in the image pickup device, thereby obtaining an effect as if an image was exposed to light for a long time. The pulse widths of the charge discharging pulses in the complete discharging area from Line[M] to Line[N] are uniform, and are sufficient to discharge the charges accumulated in the CMOS 102.

Referring back to FIG. 4, the operation controller 206 controls an operation of the curtain body traveling to block light to the CMOS 102. The operation controller 206 controls an operation of the curtain body through the shutter driver 132.

After the scan controller 204 controls the CMOS 102 to start the exposure operation, the operation controller 206 performs mechanical light blocking by traveling the curtain body after a set exposure time is elapsed, thereby ending the exposure operation of the CMOS 102.

The scan controller 204 enables the exposure start scanning of the CMOS 102 to operate as the front curtain of the shutter that starts to expose the CMOS 102 to light by assigning the reset signal to each pixel based on the scan pattern. Also, the operation controller 206 enables the curtain body that blocks light to the CMOS 102 as the rear curtain of the shutter. The scan controller 204 adjusts a pulse width of the reset signal according to the photographing scene. As such, the scan controller 204 controls the electronic front curtain shutter based on the pulse width of the reset signal according to the photographing scene, and the operation controller 206 controls the mechanical rear curtain shutter, and thus it is possible to adjust exposure according to lines or areas.

The gain adjuster 208 adjusts a gain according to predetermined areas by being synchronized with reading of pixels in a horizontal direction of the CMOS 102 by the scan controller 204 when an operation of reading each pixel of the CMOS 102 is controlled by the scan controller 204. The gain adjuster 208 adjusts a gain in pixel units of the CMOS 102 and adjusts a gain based on a predetermined function indicating a gain change width by being synchronized with a reading position of pixels in the horizontal direction of the CMOS 102.

For example, when a plurality of reading circuits on an area or pixel basis are equipped in the CMOS 102 in the horizontal direction and each reading circuit includes a gain adjustment amplifier, the gain adjuster 208 adjusts a gain of a corresponding gain adjustment amplifier for a corresponding area. A gain of a gain adjustment circuit included in the AFE 106 may be changed by being synchronized with reading of pixels in the horizontal direction. In this case, the gain adjustment circuit for adjusting a gain in the horizontal direction may be included in the AFE 106, the photographing signal processor 110, or the TG 108. The gain adjuster 208 may change a gain of the gain adjustment circuit included in the photographing signal processor 110 by being synchronized with reading of pixels in the horizontal direction. In this case, a circuit for providing a gain variation according to a position in the horizontal direction is included in the photographing signal processor 110.

Although a gain is adjusted by the gain adjuster 208 according to predetermined areas or pixels in the current embodiment, this should not be construed as limiting, and a gamma curve may be changed according to areas. The gamma curve is a characteristic curve indicating a ratio of a signal level of an input image to brightness of an output image. The CPU 122 may adjust exposure of a screen by adjusting the gamma curve.

Adjustment of a gain or adjusting of a shutter will now be described with reference to FIG. 9. FIG. 9 illustrates graphs for describing the adjustment of the gain and the shutter, according to an embodiment. In a graph 81 of FIG. 9, a gain is changed in a horizontal direction. Referring to the graph 81, exposure is adjusted by changing a gain at a right of a screen. In a graph 82, a slit width of a shutter is changed in a vertical direction. In other words, an exposure start timing of an electronic front curtain shutter is changed according to lines so as to change the slit width of the shutter. According to the graph 82, the slit width is narrow at the top of a screen.

Also, in a graph 83, a slit width of a shutter is widened in a vertical direction. The slit width at the bottom of a screen is wider in the graph 83 than the graph 82, and thus exposed light intensity is higher in a dark area. As such, the photographing apparatus 10 may adjust the exposed light intensity in the vertical direction by changing the slit width of the shutter by changing the exposure start timing of the electronic front curtain shutter according to lines. Also, it is possible to change and adjust the gain in the horizontal direction with respect to the exposed light intensity in the horizontal direction that is not adjusted by changing the slit width of the shutter. Thus, exposure may be minutely adjusted.

[4] Details of Operations of Photographing Apparatus

Figure 10A:
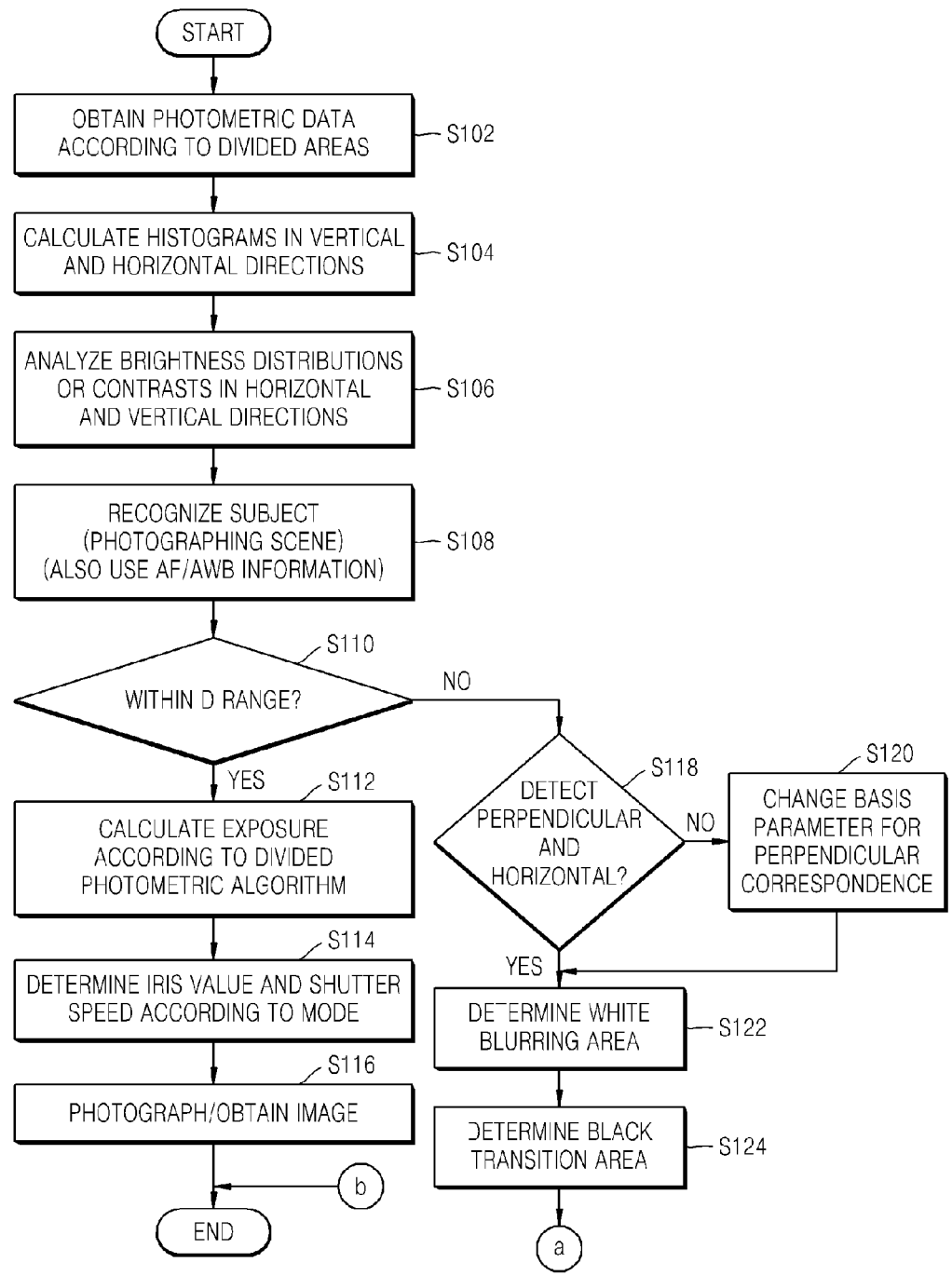
FIGS. 10A and 10B are flowcharts illustrating image compensating processes in vertical and horizontal directions, according to an embodiment.
Figure 10B:
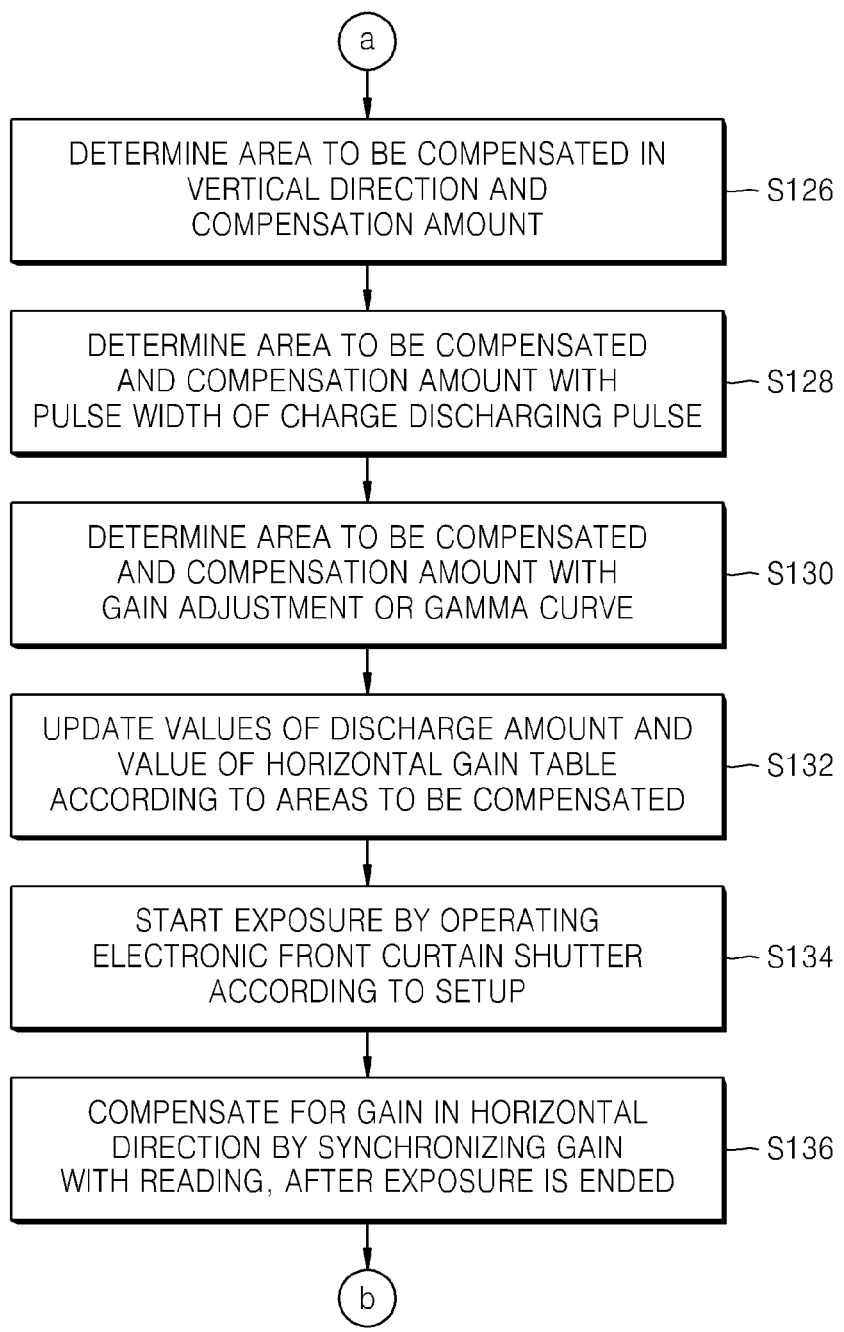

The functional configuration of the photographing apparatus 10 has been described above. Next, operations of the photographing apparatus 10 will now be described in detail with reference to FIGS. 10A and 10B. FIGS. 10A and 10B are flowcharts illustrating image compensating processes in vertical and horizontal directions, according to an embodiment. As shown in FIG. 10A, the detector 202 obtains photometric data according to divided areas in a screen, in operation S102. Then, histograms in a vertical direction and in a horizontal direction are calculated in operation S104, based on the photometric data obtained in operation S102 according to divided areas.

Brightness distributions or contrasts in the horizontal and vertical directions are analyzed in operation S106, based on the histograms in the vertical and horizontal directions calculated in operation S104. Then, a subject (photographing scene) is recognized in operation S108 from the histograms calculated in operation S104. In operation S108, not only AE information but also AF/AWB information may be used.

Also, it is determined whether the photographing scene recognized in operation S108 is within a dynamic range (D range), in operation S110.

If it is determined that the photographing scene is within the D range in operation S110, exposure is calculated in operation S112 according to a divided photometric algorithm by using the photometric data obtained in operation S102. Also, an iris value and a shutter speed are determined in operation S114 according to a set mode. The subject is photographed or an image is obtained in operation S116 by reading the charges accumulated in the image pickup device (CMOS 102) as the image pickup device is exposed to light, according to exposure scanning of the electronic front curtain and a light blocking operation of the mechanical rear curtain shutter.

Otherwise, if it is determined that the photographed scene is not within the D range in operation S110, perpendicular and horizontal holding of a camera are detected in operation S118. In operation S118, it is detected whether a user is holding the camera perpendicularly or horizontally. Here, a sensor for detecting perpendicular and horizontal directions of a housing is installed in the photographing apparatus 10, and the sensor may detect the perpendicular and horizontal directions of the camera.

When it is determined that the camera is perpendicular in operation S118, a basis parameter for perpendicular correspondence is changed in operation S120. In detail, a number of divisions of a screen, a divided range of the screen, a dividing ratio of the screen, a weight of an adjusting unit assigned by a gain or a shutter is changed. The basis parameter is changed in operation S120 because when a screen of the photographing apparatus 10 is rectangular, a dividing ratio or an area of the screen is different based on whether the camera is perpendicular or horizontal. Also, when exposure is adjusted by the shutter, a curtain speed of the shutter differs based on whether the camera is perpendicular or horizontal, and thus a scanning speed of the electronic front curtain may be changed according to the curtain speed.

The detector 202 determines a white blurring area in the screen in operation S122. Also, the detector 202 determines a blacked area (black transition area) in the screen in operation S124.

Referring to FIG. 10B, the scan controller 204 determines an area to be compensated in the vertical direction and a compensation amount in operation S126, based on the white blurring and black transition area information determined in operations S122 and S124. Then, an area to be compensated and a compensation amount are determined in operation S128 by adjusting a pulse width of a charge discharging pulse based on the area to be compensated and compensation amount determined in operation S126. Next, an area to be compensated and a compensation amount by gain adjustment or gamma curve are determined in operation S130.

Then, in operation S132, a value of a discharge amount of the electronic front curtain shutter is updated by the area to be compensated and the compensation amount determined in operation S128, and a value of a horizontal gain table is updated by the area to be compensated and the compensation amount determined in operation S130. The value of the discharge amount is updated by updating a value of the pulse width of the charge discharging pulse.

Also, in operation S134, the electronic front curtain shutter is operated based on a predetermined scan table, and exposure is started by using the pulse width of the charge discharging pulse updated in operation S132. A gain in a horizontal direction is compensated for in operation S136 by starting the exposure in operation S134, and synchronizing with reading of the charges accumulated in the CMOS 102 according to a light blocking operation of the mechanical rear curtain shutter.

The image compensating processes in the vertical and horizontal directions have been described. As shown in FIGS. 10A and 10B, the photographing apparatus 10 may adjust the exposed light intensity in the vertical direction by changing the pulse width of the charge discharging pulse of the electronic front curtain shutter. Also, it is possible to compensate for the exposed light intensity in the horizontal direction, which is not compensated for by adjusting the slit width of the shutter, by adjusting the gain in the horizontal direction.

As described above, according to the embodiments, photographing may be performed in a wide dynamic range by adjusting a discharging time taken to discharge charges accumulated in an image pickup device.

As another example, the operations of the photographing apparatus 10 do not have to be processed in a time series according to the order shown in the flowchart. That is, the operations of the photographing apparatus 10 may be performed in parallel.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The non-transitory computer-readable media may include a RAM equipped in the photographing apparatus 10. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographing apparatus, comprising:
an image pickup device having a plurality of pixels arranged in a matrix form and that photographs a subject by being exposed to light;

a detector that detects a photographing state of the subject;

an operation controller that controls an operation of a curtain body traveling to block light to the image pickup device; and a scan controller that controls an exposure start scanning of the image pickup device by discharging charges accumulated in the image pickup device before the traveling of the curtain body, wherein the scan controller adjusts a discharging time for discharging the charges accumulated in the image pickup device according to the photographing state of the subject such that a portion of accumulated charge remains after the discharging.

2. The photographing apparatus of claim 1, wherein the scan controller facilitates the exposure start scanning of the image pickup device to operate as a front curtain of a shutter for starting the exposure of the image pickup device by discharging the charges accumulated in the image pickup device, and wherein the operation controller facilitates the curtain body to block light to the image pickup device to operate as a rear curtain of the shutter.

3. The photographing apparatus of claim 1, wherein the detector detects whether the photographing state of the subject is within a suitable dynamic range when an image is reproduced, and wherein the scan controller adjusts the discharging time for discharging the charges accumulated in the image pickup device if the detector detects that the photographing state of the subject is outside the suitable dynamic range.

4. The photographing apparatus of claim 1, wherein the scan controller generates a discharging pulse for discharging the charges accumulated in the image pickup device to correspond to a traveling curve of the curtain body, and adjusts a pulse width of the discharging pulse according to the photographing state of the subject.

5. The photographing apparatus of claim 1, wherein the scan controller adjusts the pulse width of the discharging pulse according to lines of the image pickup device.

6. The photographing apparatus of claim 1, wherein the scan controller adjusts the pulse width of the discharging pulse according to areas of the image pickup device.

7. The photographing apparatus of claim 1, wherein the scan controller adjusts the discharging time according to brightness information of the subject.

8. The photographing apparatus of claim 7, wherein the scan controller sets the discharging time to be shorter than a predetermined discharging time if brightness of the subject is lower than a predetermined reference value.

9. The photographing apparatus of claim 8, wherein the scan controller sets the discharging time to decrease stepwise according to the brightness of the subject, if the brightness of the subject is lower than the predetermined reference value.

10. The photographing apparatus of claim 1, wherein the scan controller controls read scanning of each pixel of the image pickup device, and wherein the photographing apparatus further comprises a gain adjuster that adjusts a gain according to predetermined areas by synchronizing with reading of pixels in a horizontal direction of the image pickup device by the scan controller.

11. A photographing method of photographing a subject by exposing an image pickup device having a plurality of pixels arranged in a matrix form to light, the photographing method comprising:

detecting a photographing state of the subject;

operating a curtain body traveling to block light to the image pickup device starting exposure of the image pickup device by discharging charges accumulated in the image pickup device before the traveling of the curtain body and adjusting a discharging time for discharging the charges accumulated in the image pickup device according to the photographing state of the subject, such that a portion of accumulated charge remains after the discharging.

12. The photographing apparatus according to claim 1, wherein the scan controller adjusts a discharging time for discharging the charges accumulated in the image pickup device according to the photographing state of the subject such that a portion of accumulated charge remaining in the image pickup device varies across the image pickup device.

13. The photographing apparatus according to claim 12, wherein the accumulated charge remaining in the image pickup device varies based on a line number.

* * * * *